United States Patent
Toomey

[15] 3,680,314
[45] Aug. 1, 1972

[54] HYDRAULIC EMERGENCY BRAKE SYSTEM

[72] Inventor: Francis J. Toomey, 1888 Kearns Ave., Pittsburgh, Pa. 15205

[22] Filed: Nov. 19, 1969

[21] Appl. No.: 870,372

[52] U.S. Cl............60/54.5 E, 188/345, 60/54.6 E, 303/13
[51] Int. Cl.............................F15b 7/00
[58] Field of Search............60/54.5, 54.5 E, 54.6 E; 188/152.02; 303/13; 137/112

[56] References Cited

UNITED STATES PATENTS

| | | | |
|---|---|---|---|
| 3,338,257 | 8/1967 | Ferguson | 137/112 |
| 3,232,058 | 2/1966 | Ayers | 60/54.6 E |
| 3,478,517 | 11/1969 | Shellhouse | 60/54.6 E |
| 1,630,178 | 5/1927 | Harrington | 188/152.02 |
| 1,987,435 | 1/1935 | Engel | 303/13 X |
| 2,008,975 | 7/1935 | Boughton et al | 188/152.02 |
| 2,201,086 | 5/1940 | Guderian | 60/54.6 E |
| 3,114,581 | 12/1963 | Tuszynski | 60/54.5 E |
| 3,500,725 | 3/1970 | Haddock | 60/54.6 E |

*Primary Examiner*—Martin P. Schwadron
*Assistant Examiner*—A. M. Zupcic
*Attorney*—William J. Ruano

[57] ABSTRACT

An automotive vehicle, hydraulic emergency brake system comprising two parallel systems, one operated by the foot pedal brake and the other, by the emergency brake. To each wheel cylinder is connected a Tee valve having one arm connected to each system and which Tee valve is pressure-responsive so as to automatically close off whichever system has developed a leak, whereby the other system can still operate all four wheel brakes.

2 Claims, 4 Drawing Figures

PATENTED AUG 1 1972 3,680,314
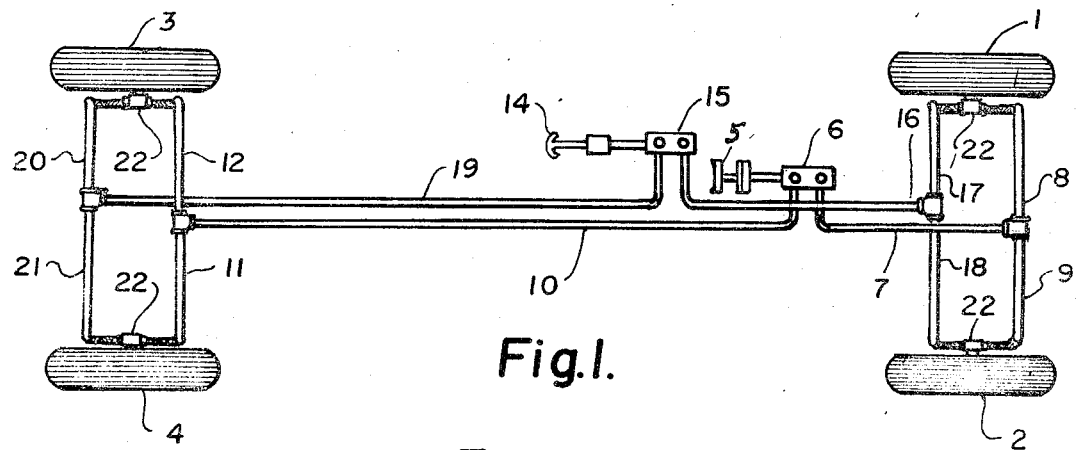
Fig.1.
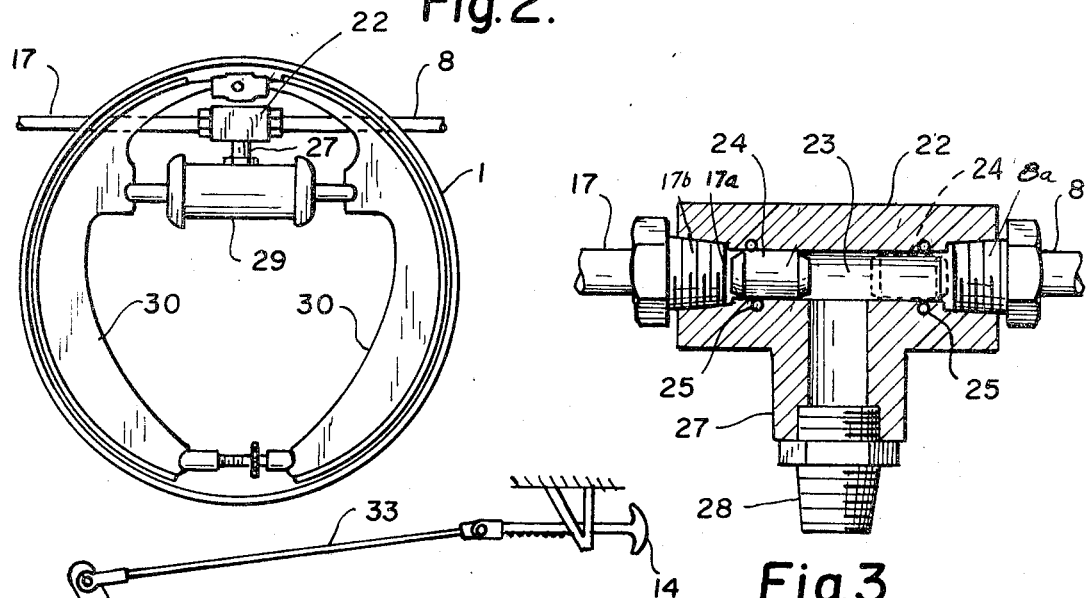
Fig.2.
Fig.3.
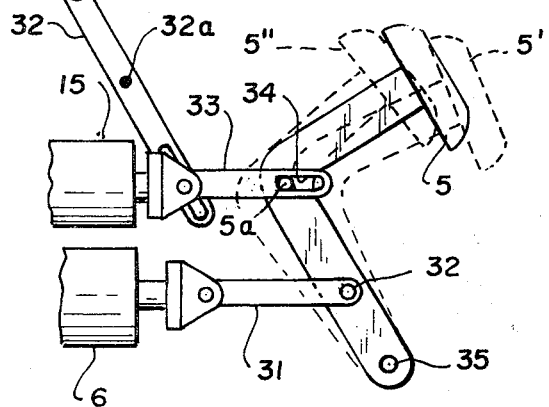
Fig.4.
INVENTOR.
FRANCIS J. TOOMEY
BY
William J. Ruano
his ATTORNEY

HYDRAULIC EMERGENCY BRAKE SYSTEM

This invention relates to a hydraulic emergency brake system for automotive vehicles and the like and is useful for other similar hydraulic or fluid pressure systems, such as steering systems and the like.

An outstanding disadvantage of conventional vehicle hydraulic brake systems is that if the master cylinder of the foot brake system fails, all four wheel brakes become inoperative. Dependence then must be made on a mechanical emergency brake system, which generally operates the two rear wheels. Such mechanical emergency brake systems are rarely adjusted properly so that either the right or left brake applies first, making the vehicle swerve and subject to danger, also, mechanical brakes do not bring present vehicles to a safe complete stop in a relatively short distance when the car is running at a high rate of speed.

An object of the present invention is to provide a novel emergency brake hydraulic system which overcomes the above-named disadvantages and which will enable braking of all four wheels hydraulically even in the event of a break and leakage of liquid in the hydraulic system.

A more specific object of the invention is to provide two parallel systems for operating the four hydraulic brakes of a vehicle, one parallel system operated by a foot pedal and the other, by the emergency brake, and involving a valve mounted on each wheel which selectively introduces hydraulic fluid to either one system or the other while sealing off the system in which a leak occurs.

Another object of the present invention is to provide, in an emergency hydraulic brake system, a novel Tee valve mounted on each wheel and connected to the wheel cylinder, which valve will automatically shut off the pedal brake hydraulic system if a leakage occurs therein and enable application of all four of the same hydraulic brakes by the emergency brake.

A still further object of the invention is to provide an emergency hydraulic brake system which can be easily, quickly and inexpensively adapted to conventional hydraulic brake systems in a minimum amount of time, with very little effort and at very low costs.

Other objects and advantages will become more apparent from a study of the following description taken with the accompanying drawing wherein:

FIG. 1 is a plan and somewhat schematic view of a vehicle emergency hydraulic brake system embodying the present invention;

FIG. 2 is an enlarged, side view of one of the four hydraulic brakes, showing the Tee valve embodied in the present invention connected to the wheel cylinder;

FIG. 3 shows an enlarged, cross-sectional view of the Tee valve shown in FIG. 2; and, FIG. 4 shows a modification, illustrating how a single brake operating pedal may operate, automatically in succession, the hydraulic pedal brake system and then the emergency brake system when the former fails.

Referring more particularly to FIG. 1 of the drawing, numerals 1, 2, 3 and 4 denote the respective four wheels and associated hydraulic brakes. Numeral 5 denotes the brake pedal for conventional dual master cylinder 6 so as to exert pressure in front conduits 7, 8 and 9, which, in turn, are connected to one arm of Tee valves 22 connected to the front wheel brakes. Similarly, and simultaneously fluid pressure in rear conduits 10, 11 and 12 introduce fluid under pressure to one arm of the respective Tee valves 22 so as to pressurize the rear wheel cylinders, such as 29, shown in FIG. 2 and the rear brakes.

A parallel connected emergency brake system is provided which is actuated by the emergency brake 14, which may be either a hand brake or a foot brake, and which emergency brake operates the conventional dual master cylinder 15 so that hydraulic liquid under pressure is conveyed to front conduits 16, 17 and 18 to the other arms of Tee valves 22 to introduce liquid, under pressure, in the front wheel cylinders 29. Similarly, and simultaneously fluid under pressure is conducted through rear conduits 19, 20 and 21 to the other arms of Tee valves 22 of the rear brake.

FIG. 3 more clearly illustrates the construction and operation of each of the four Tee valves 22. In a cylindrical bore 23 there slides a cylindrical valve operating element 24 having tapered ends which are adapted to sealingly engage correspondingly shaped seats 17a formed in the ends of threaded couplings 17b. O rings 25 seal element 24 to bore 23 and frictionally hold it in position. Normally, brake fluid under pressure in the conventional brake system operated by pedal 5 will be introduced through conduit 8 and will force the brake operating element 24 to the left or full line position, as viewed in FIG. 3, so that under normal conditions, the hydraulic emergency brake system, operated by emergency brake 14, will be sealingly closed off the existing brake system by virtue of the sealing connection made between the left tapered end portion of element 24 and seat 17a. In some instances, a biasing spring (not shown) may be interposed between the right side of element 24 and the end of threaded coupling 8a at the right of valve 22.

When it is desired to apply the foot pedal 5, braking fluid will pass through paths identical to that shown in FIG. 3 through all four of the Tee valves 22 so as to actuate the wheel cylinders 29 and apply all four hydraulic brakes.

However, when the emergency brake 14 is applied because of a leak in the pedal operated normal brake system, it will create a greater pressure on the left side of element 24 than on the right side, as viewed in FIG. 3, so as to force it to move to the right, that is, to the dotted line position, as shown, into sealing engagement with the correspondingly shaped seat in coupling 8a so as to seal off the conventional pedal brake system connected to conduit 8 and allow fluid pressure to be introduced from conduit 17, connected to the emergency hydraulic brake system, through the threaded connection 28 to the wheel cylinder 29.

Thus, upon application of emergency brake 14, hydraulic fluid will enter through conduit 17 into the leg 27 of the Tee valve 27 and thus pressurize the wheel cylinder 29 so as to operate brake shoes 30.

It will be apparent that if the broken hydraulic line occurs in the front wheel brake system, such as in conduit 7, 8 or 9, application of the emergency brake 14 will be still effective to apply the front and rear hydraulic brakes because lines 8 and 9 are sealed off of the system by O rings 25 shown at the right of FIG. 3. Similarly, if there is a broken line in the rear wheel brake system, such as in conduits 11 and 12, Tee valves 22 will automatically seal off such lines and enable hydraulic fluid to be introduced from conduit 19 to parallel connected conduits 20 and 21 to the other arm of the Tee valve 22 so as to apply the rear brakes, as well as the front brakes, to thus enable applying all four brakes hydraulically.

If, however, a broken hydraulic wheel cylinder occurs in the front, the front wheel brakes would be lost to the conventional foot pedal system and to the front wheel emergency brakes, but the rear wheel brakes can be applied hydraulically, either by foot pedal 5 or emergency brake 14. Similarly, if there occurs a broken wheel cylinder in the rear, the rear wheel brakes will be lost to the foot pedal system and to the emergency system, but the front wheel brakes can be applied hydraulically by either the foot pedal 5 or emergency brake 14.

When it is realized that many brake failures are due to failure of the master cylinder, it will appear that normally, in case of breakage in the line, all four hydraulic brakes can still be applied by the emergency brake 14, which brake 14 is held in reserve at all times. In other words, there is always present an additional reserve of hydraulic fluid to be used by operating the emergency brake 14. In order to lose the hydraulic brake on both brake systems at one time, it would be necessary to break the hydraulic lines in four different places at the same time, which is almost impossible.

FIG. 4 shows a modification illustrating how the emergency brake and foot brake may be interconnected, if desired, to avoid time loss by the operator in reacting to a possible accident, so that when the foot pedal operates within normal limits, such as between 5 and 5', its pin 5a would travel merely to the end of slot 34 in link 33 and operate only the conventional dual master cylinder 6 through pin 32 connected to link 31. However, should a leak occur in the pedal to be depressed abnormally to position 5'', this will cause actuation of the emergency dual master cylinder 15 and cause operation of the emergency hydraulic brake system. Of course, other means for sequentially operating the normal brake system and emergency brake system by a single pedal will be readily suggested to those skilled in the art.

While the above system has been described as a hydraulic one, it may also be used in air brakes having one side of the Tee valve 22 attached to the foot treadle system on the tractor and the other side attached to the hand valve. A double set of air lines would be needed on the trailer. Thus, if air is lost in the foot treadle system, then by applying the hand valve, the Tee valves are activated, sealing off the leak in the foot treadle system and enabling applying the brakes with the hand valve system. Thus, the vehicle is not stopped in a dangerous place or where it is not desired to be stopped. Upon release of the hand valve, the vehicle may be moved to a garage where it may be repaired.

While the parallel hydraulic system of the present invention has been described for braking of a vehicle, it may be used for operating a steering mechanism of a ship or plane.

An outstanding feature of the present invention is that it can be very easily, quickly adapted to existing, conventional hydraulic brake systems operated by a foot pedal. This can be done simply by removing the present four hydraulic lines on a car at the backing plate of each wheel leading to the wheel cylinder. Then four Tee valves 22, as shown in FIG. 3, are installed. Each of the hydraulic lines that were removed is connected to one side or arm of the Tee valve. The new dual master cylinder 15 may be installed on the fire wall of the care. The hand emergency brake 14 on the vehicle is then hooked up to activate the newly installed master cylinder 15. Hydraulic lines are installed from the emergency brake master cylinder 15 to the other side of the Tee valve. In the case of the front wheels, rubber hydraulic hoses or other flexible hoses are used to enable steering movements. Therefore, the front hydraulic line goes to the fitting on the frame and the flexible hydraulic hose will extend from this fitting to its associated Tee valve 22.

Thus it will be seen that I have provided a highly efficient hydraulic brake system which enables emergency application of all four brakes hydraulically in case of a leak of the conventional pedal brake operating hydraulic system, also which hydraulic emergency brake will serve very effectively and reliably as a parking hydraulic brake which holds the vehicle stationary far more securely than mechanical safety brakes; furthermore, I have provided parallel hydraulic systems, one operated by the pedal brake and the other operated by the emergency brake, so that if leakage occurs in either system, there will be one remaining system than can operate all four of the brakes hydraulically.

While I have illustrated and described a single specific embodiment of my invention, it will be understood that this is by way of illustration only, and that various changes and modifications may be made within the contemplation of my invention and within the scope of the following claims.

I claim:

1. An automatic, safety, hydraulic fluid pressure system for operating the four braking wheel cylinders of four vehicle wheel brakes simultaneously, comprising, in combination, a two-way valve associated with each braking wheel cylinder for introducing hydraulic braking fluid selectively through either of two inlets of each valve to each of said braking wheel cylinders, two dual master cylinders, two separate and independent conduit means, each interconnecting one of said dual master cylinders to all four of said braking wheel cylinders through one of said valve inlets of each valve, each of said two-way valves being automatically responsive to the pressure differential applied to its inlets as developed by both said dual master cylinders so as to automatically connect only one of said dual master cylinders to said four wheel cylinders through one of said conduit means at any one time and completely disconnect the other of said master cylinders and of said conduit means from the braking system as the result of loss of pressure from a leak in one of said conduit means so as to seal off said leak from the braking system, each of said valves having a connection in the form of a tee, one leg being connected to a wheel cylinder, a second leg connected to a system operated by one of said dual master cylinders and a foot brake pedal, and a third leg connected to an emergency brake system connected to the other of said dual master cylinders and operated by an emergency brake, and a linkage between said foot brake pedal and emergency brake for sequentially operating the emergency brake by foot pressure after an abnormally great movement of the foot pedal in response to a leakage in the foot brake system, whereby the emergency brake will apply hydraulic pressure to all four wheel cylinders.

2. A hydraulic emergency brake system as recited in claim 11 wherein each of said valves includes a slidable, pressure responsive cylindrical element having tapered end portions cooperable with seats formed in the ends of threaded couplings screw threaded to said cylindrical element, a sealing ring rigidly mounted in each of the two legs of said tee connected to the respective dual master cylinders for frictionally holding said cylindrical element in selective positions and whereby when a leak develops in one system, it will be automatically shut-off in response to movement of said cylindrical element in response to a higher pressure from the other system.

* * * * *